US010343329B2

(12) United States Patent
Saelen

(10) Patent No.: US 10,343,329 B2
(45) Date of Patent: *Jul. 9, 2019

(54) VACUUM THERMOFORMING MOLD DEVICE AND A MANUFACTURING METHOD EMPLOYING SAME

(71) Applicant: REYDEL AUTOMOTIVE B.V., Kn Baarn (NL)

(72) Inventor: Marc Saelen, Allennes les Marais (FR)

(73) Assignee: REYDEL AUTOMOTIVE B.V., Kn Baarn (NL)

( * ) Notice: Subject to any disclaimer, the term of this patent is extended or adjusted under 35 U.S.C. 154(b) by 205 days.

This patent is subject to a terminal disclaimer.

(21) Appl. No.: 15/370,812

(22) Filed: Dec. 6, 2016

(65) Prior Publication Data

US 2017/0165897 A1    Jun. 15, 2017

(30) Foreign Application Priority Data

Dec. 10, 2015 (FR) ...................................... 15 62151

(51) Int. Cl.
*B29C 51/36* (2006.01)
*B29C 51/08* (2006.01)
(Continued)

(52) U.S. Cl.
CPC ............ *B29C 51/36* (2013.01); *B29C 51/087* (2013.01); *B29C 51/10* (2013.01); *B29C 51/20* (2013.01);
(Continued)

(58) Field of Classification Search
None
See application file for complete search history.

(56) References Cited

U.S. PATENT DOCUMENTS 5,074,770 A     12/1991  Graefe
10,000,006 B2 *  6/2018  Saelen .................... B29C 51/36
(Continued)

FOREIGN PATENT DOCUMENTS

EP      1854616 A2   11/2007
EP       295500 A1   12/2015
(Continued)

OTHER PUBLICATIONS

International Search Report dated May 18, 2016.

*Primary Examiner* — Monica A Huson
(74) *Attorney, Agent, or Firm* — Dickinson Wright PLLC

(57) ABSTRACT

A molding device for thermoforming, comprising a two-part mold that makes it possible to define an open and a closed state of the mold is provided. The first part of the two-part mold comprises a means of suction for pressing the sheet against its working surface. The means of suction includes a main means of suction and at least one secondary means of suction that is designed for and capable of generating suction in a specific limited area of the working surface, at least partially independently relative to the main means of suction. The second part of the mold comprises an added-on hollow shaping part, that is arranged so that it is located, when the mold is closed, directly facing the specific limited area of the working surface of the first part of the mold. The secondary means of suction can be controlled independently of the main means of suction.

18 Claims, 19 Drawing Sheets

(51) Int. Cl.
*B29C 51/10* (2006.01)
*B29C 51/20* (2006.01)
*B29C 51/26* (2006.01)
*B29C 51/42* (2006.01)
B29L 31/30 (2006.01)
B29K 101/12 (2006.01)
B29K 105/00 (2006.01)

(52) U.S. Cl.
CPC .......... *B29C 51/266* (2013.01); *B29C 51/421* (2013.01); *B29C 2791/006* (2013.01); *B29K 2101/12* (2013.01); *B29K 2105/256* (2013.01); *B29L 2031/3005* (2013.01); *B29L 2031/3041* (2013.01)

(56) References Cited

U.S. PATENT DOCUMENTS

| | | |
|---|---|---|
| 2007/0216070 A1 | 9/2007 | Dutouquet |
| 2013/0221698 A1 | 8/2013 | Nowik et al. |

FOREIGN PATENT DOCUMENTS

| | | |
|---|---|---|
| FR | 2900862 A1 | 11/2007 |
| JP | 2008037056 | 2/2008 |
| WO | 9425248 A1 | 11/1994 |

\* cited by examiner

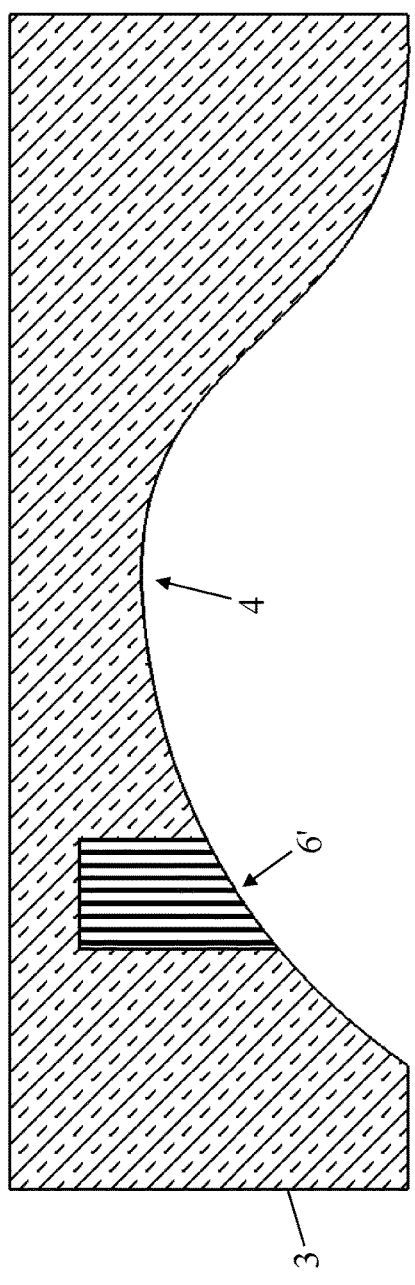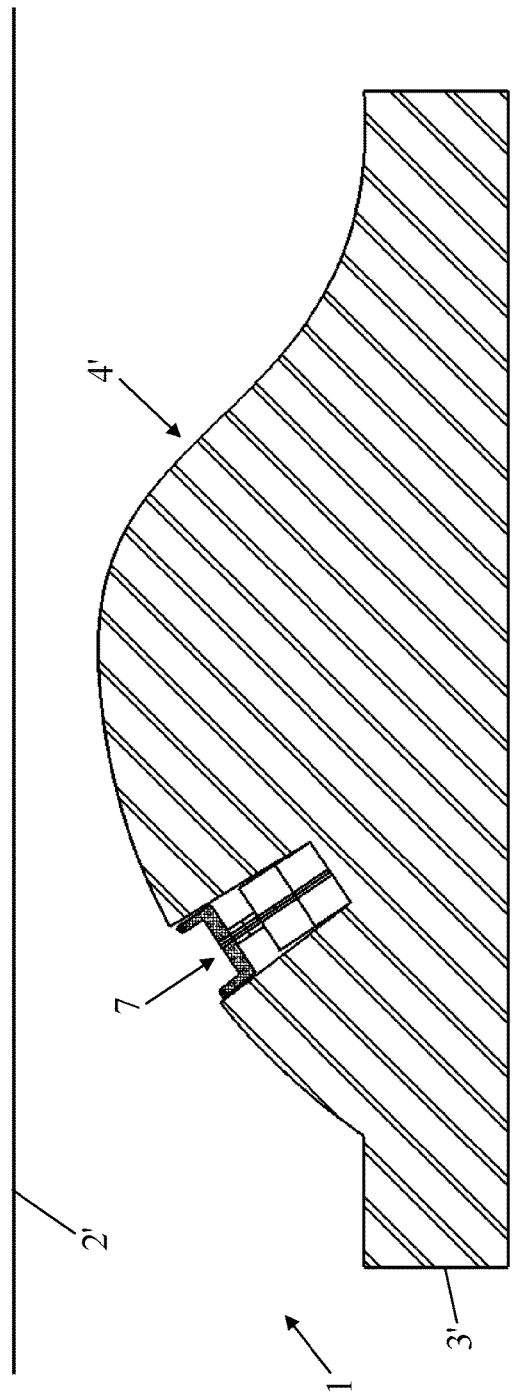
FIG. 2A

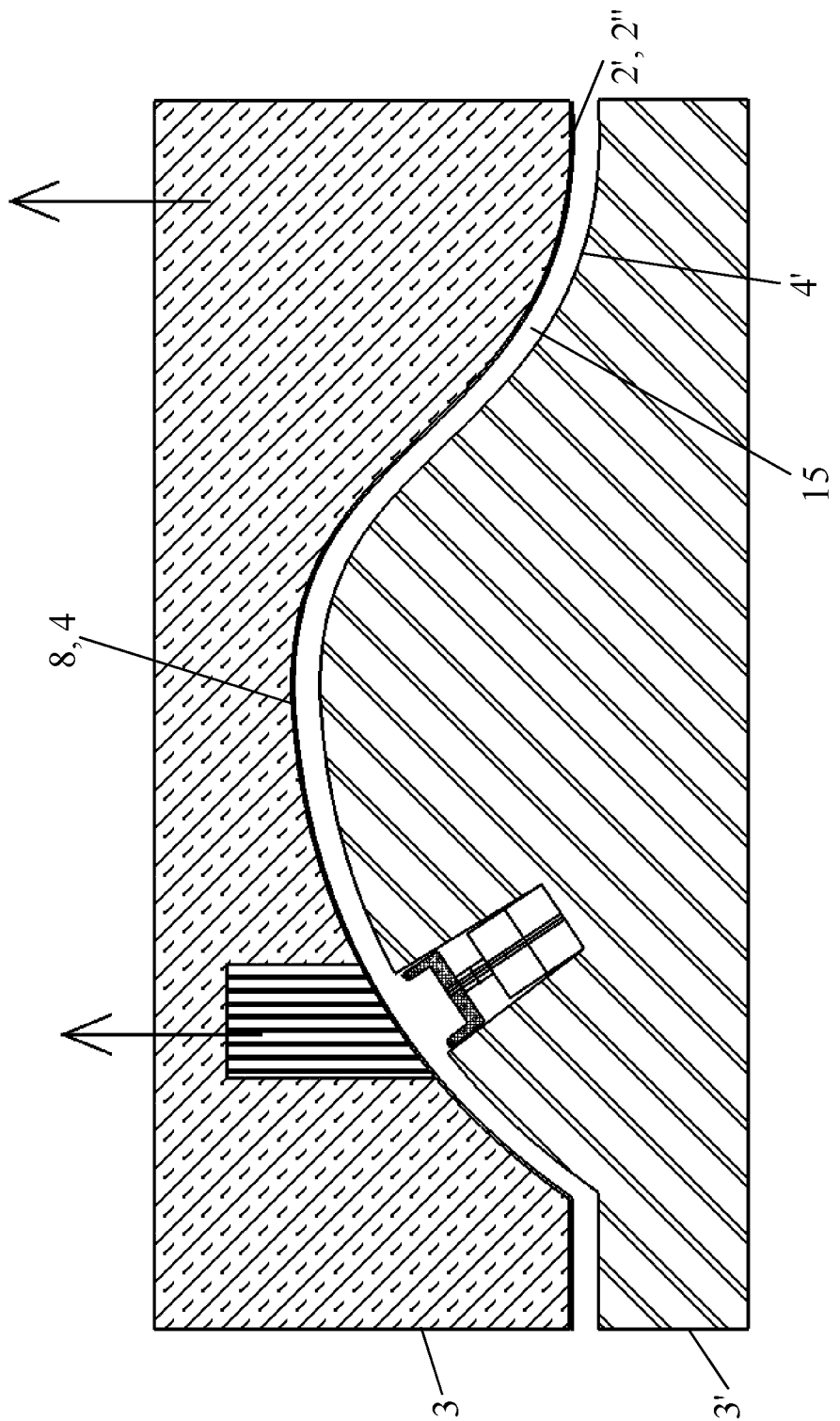

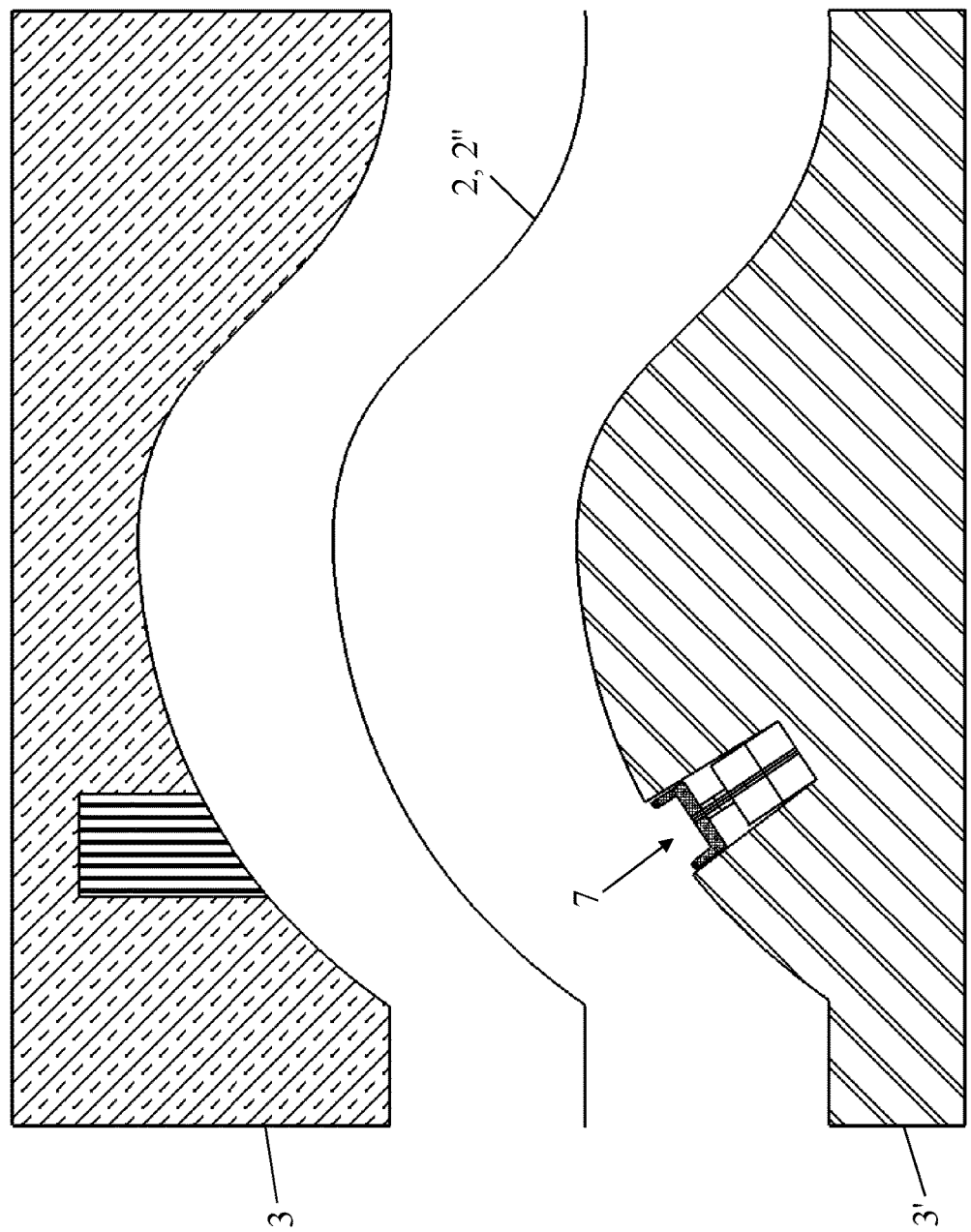

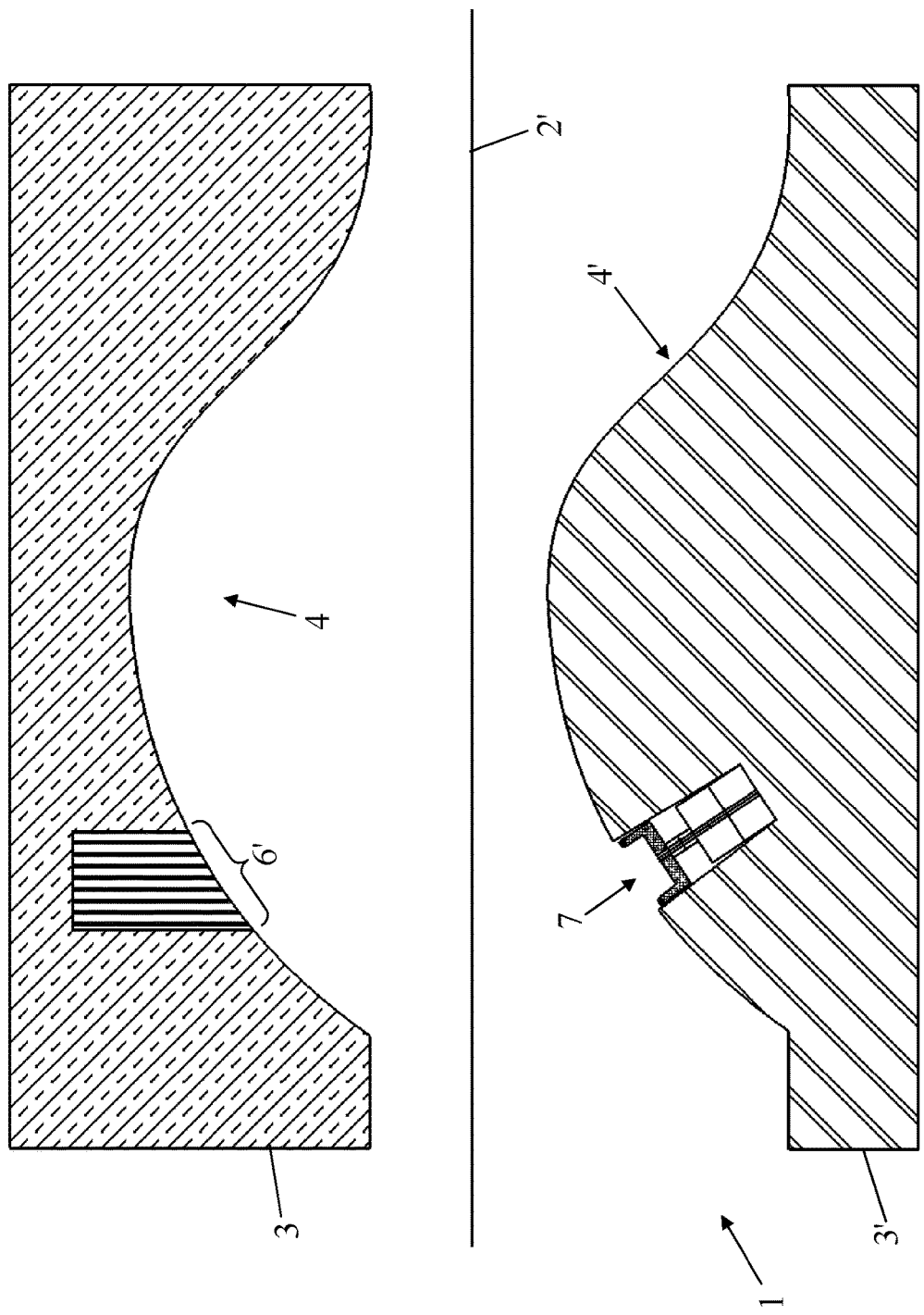

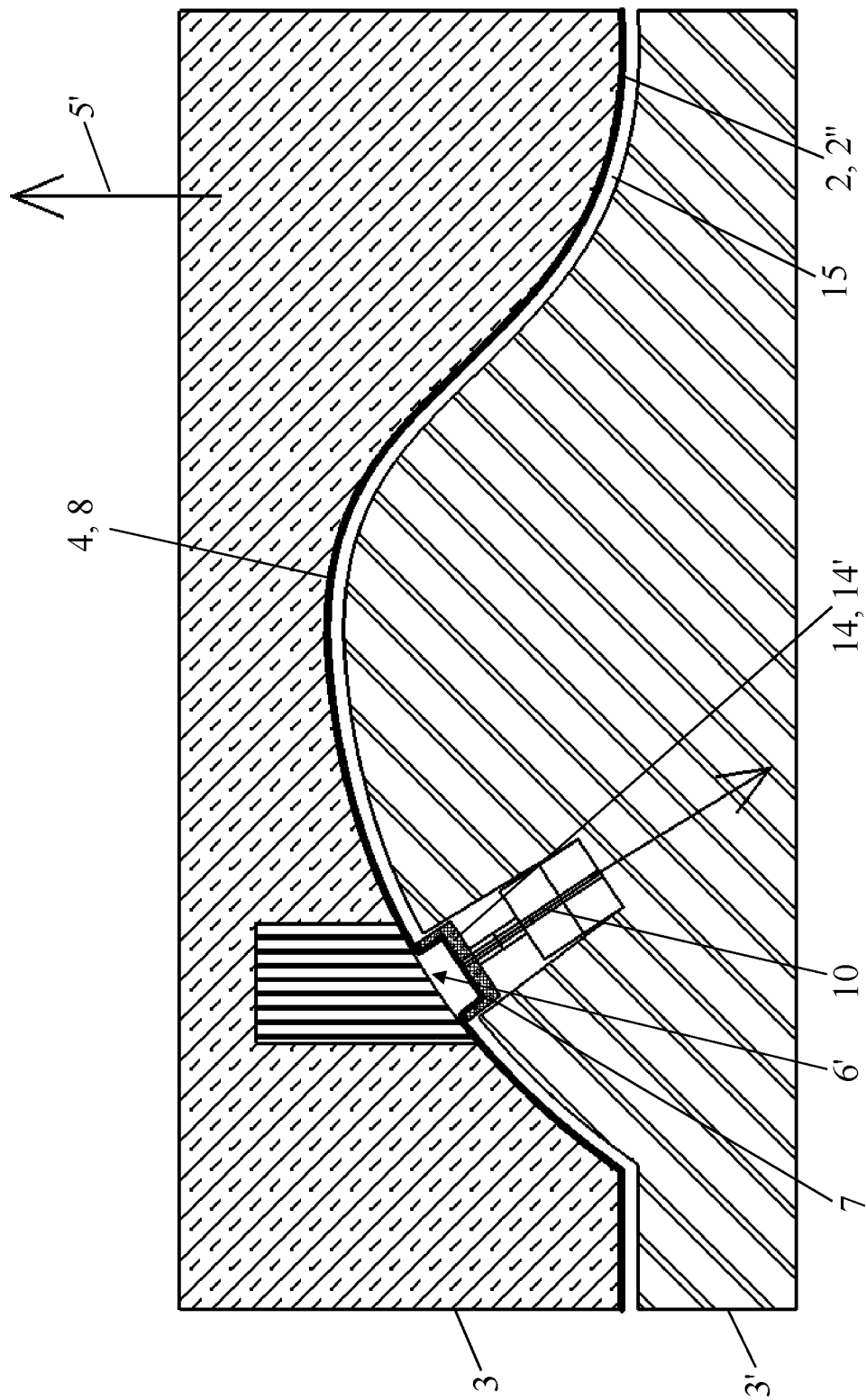

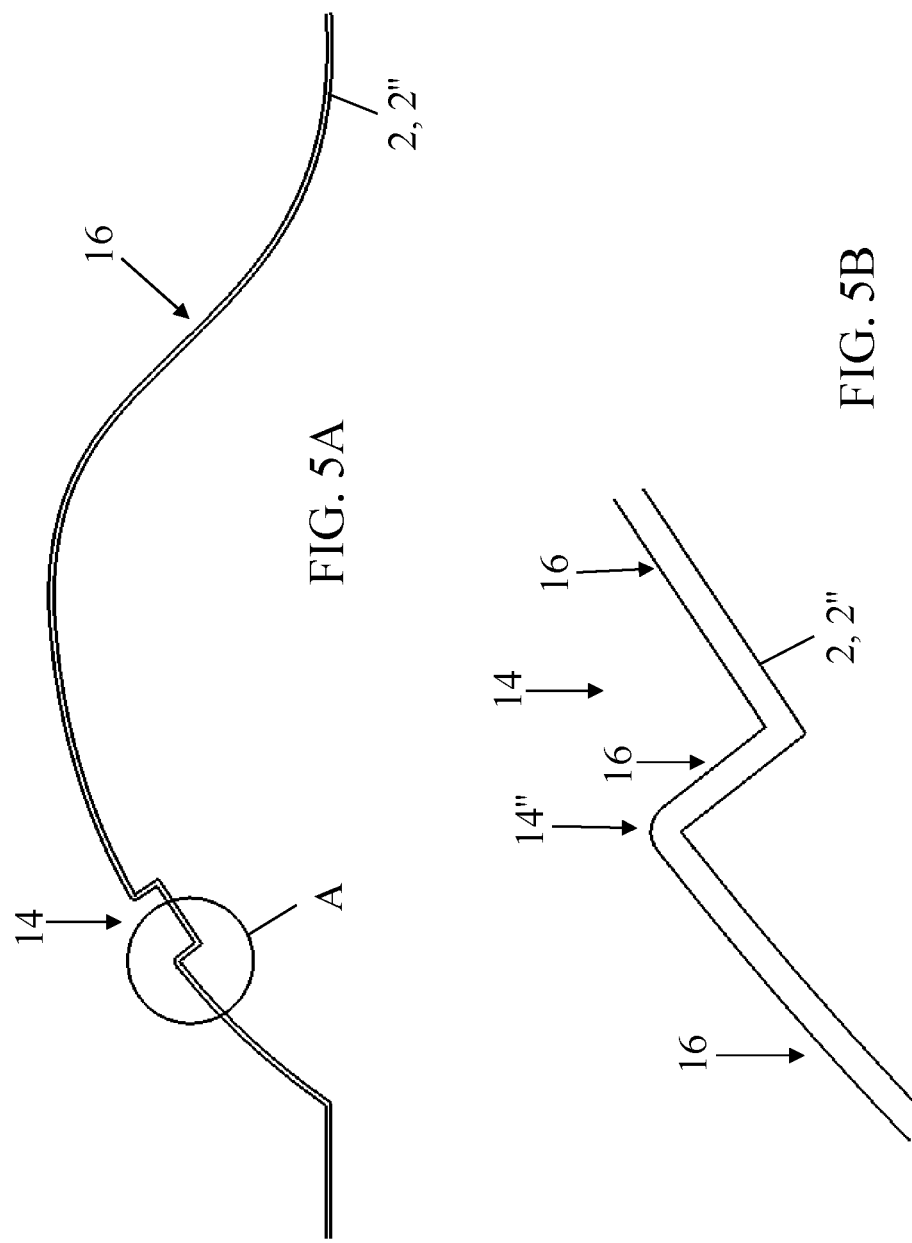

VACUUM THERMOFORMING MOLD DEVICE AND A MANUFACTURING METHOD EMPLOYING SAME

This US utility patent application claims benefit of French patent application no. 1562151, filed Dec. 10, 2015, the entire contents of which is incorporated herein by reference for all purposes.

BACKGROUND

1. Technical Field

The present invention concerns the field of producing components for trimming or interior lining for automotive vehicles, more specifically components of this type comprising or consisting of a sheet or plate of thermoplastic material, shaped in an adapted manner and which may or may not have relief patterns, shaped into the solid material.

The subject of the invention is, more specifically, a molding device for the manufacture, by negative vacuum shaping, of parts from sheets or plates, and a manufacturing process that uses this device and a trimming component obtained by this process.

2. Related Art

Different processes used for the manufacture of parts by forming under negative pressure (better known under the English-language designation "Negative Vacuum Forming") are already known in the state of the art (see for example: FR 2 900 862, US 2013/0221698).

In general, in this type of process, a sheet or a plate made of plastic material is pre-heated, then placed between two parts of a mold (or half-molds) which pre-form it during the closing process and, after the mold has been fully closed, a relative vacuum is applied to the part of the mold that comes into contact with the visible surface of the part, resulting in the final forming of the part. Eventually, while pressure is being applied as a result of the surface suction, relief patterns or embossing are made on the visible surface (negative embossing present on the part of the mold that is subjected to suction).

This method of vacuum forming offers many advantages, among which, especially, is an excellent quality of embossing and deformations that must be included on the visible surface, as well as a precise placement of these latter features.

Nevertheless, when the design must be changed, even locally, and/or if one or more specific deformations is/are planned, for example for different versions of the same part, it is necessary to provision as many mold parts (at least for the visible surface) as there are versions of the part, even if some of these versions are not different from each other except in minor or local differences (differences in the size or shape of a reinforcement of a recess for mounting an accessory, management of the presence/absence of locally deformed areas, creation of blanks of areas for mounting or anchoring of projecting equipment or decorative elements, etc.)

Also, the necessity of replacing parts of the mold between two phases of manufacturing of different versions of the same piece drastically reduces the yield and productivity of the tooling and staff, and necessitates the acquisition of specific means to make it possible to change mold parts quickly.

In actual practice, negative thermoforming of a skin or part made of thermoplastic material is generally conducted using, on the one hand, a mold in the shape of a shell, made of nickel and having miniscule holes allowing for the evacuation of air between the sheet to be formed and printed, and the shell. The depression resulting from this vacuum both shapes and engraves the grain of the plate. This shell is produced in a single-block manner by electrodeposition. It is extremely difficult, even impossible, to have an additional part without the jointure between the two parts of the shell being visible in the completed part. If we wish, therefore, optional structures such as housings for a decorative ring, aerators, or startup buttons, at present, as many different shells are required as there are optional versions.

In an attempt to overcome this limitation, the applicant has developed a primary solution in which the complementary part of the mold (in relation to the part of the mold that is in the shape of a shell involved in the negative thermoforming) is equipped with a local hollow shaping part, one that is moveable and connected to a source of vacuum or suction.

When it is activated, consecutive to the general thermoforming of the heated sheet by suction against the first part of the mold, this shaping part uses the sheet, which is in a state that makes its plastic deformation possible, to create a suction cavity that creates the local deformation desired.

This solution is described in the European patent application n° 15305881.3 in the name of the applicant. Although this solution is satisfactory, it has been observed that under certain conditions, as a function in particular of the sequencing of the process, of the type of material the sheet is made of and/or the thickness of this sheet, the skin or preformed part treated by negative thermoforming may, although it may not yet be completely cooled off and the suction on the side of the shell may be shut off, (semi-release of the skin/part between the two parts of the mold), experience shrinkage, with the final dimensions of the resulting part being less than the expected dimensions.

SUMMARY

One purpose of the present invention is, in particular, to remedy the abovementioned drawback, by proposing a second solution in the abovementioned context.

To this end, one of the subjects of the invention is a thermoforming molding device used to produce a thin-walled part from a sheet made of thermoplastic material, the molding device consisting of a two-part mold with working surfaces that are of shapes that are noticeably complementary and of which at least one of the parts is moveable such that it defines an open and a closed state of the mold, with the first part of a two-part mold comprising a means of suction used to press the plate against its working surface, the means of suction comprising, on the one hand, a main means of suction that is designed for and capable of generating a negative pressure or suction on a major portion of the working surface of the first part of the mold and, on the other hand, at least one secondary means of suction that is designed for and capable of generating a negative pressure or suction in at least one specific limited area of the working surface, with this at least partially independently relative to the main means of suction, molding device distinguished by the fact that the second part of mold comprises at least one integrated zone or an additional hollow shaping part, with the zone or part being arranged so that it is located, when the mold is closed, directly facing or respectively from each specific limited area of the working surface of the first part of the mold, with the or each secondary means of suction being capable of being controlled, at least for stopping it or for suspending the suction, independently of the main means of suction.

The invention also concerns a manufacturing process that uses the abovementioned molding device.

BRIEF DESCRIPTION OF THE DRAWINGS

The invention will be better understood, thanks to the description below, which relates to preferred manners of embodiment, given as non-limiting examples, and explained with reference to the attached schematic drawings, in which:

FIGS. 2A through 2D, on the one hand, and FIGS. 4A through 4G, on the other hand, are schematic section and lateral elevation views of a molding device as shown in FIG. 1B, illustrating the various consecutive operational manufacturing steps of a part or thin-walled skin in compliance with the process according to an embodiment of the invention, namely respectively without hollow local deformation (FIGS. 2A through 2D) and with hollow local deformation (FIGS. 4A through 4G);

FIG. 5A is a section view of a part obtained with the variation of execution of the process of FIGS. 4A through 4G; and FIG. 5B is a view, in another scale, of detail A in FIG. 5A, and FIGS. 6A through 6C are detailed lateral elevation and section views that illustrate three consecutive steps of one variation of embodiment of the manufacturing process according to an embodiment of the invention, more specifically of the deformation and unmolding phases, with the help of a molding device as shown in FIG. 1B.

DESCRIPTION OF EXAMPLE EMBODIMENTS

Figure 1A:
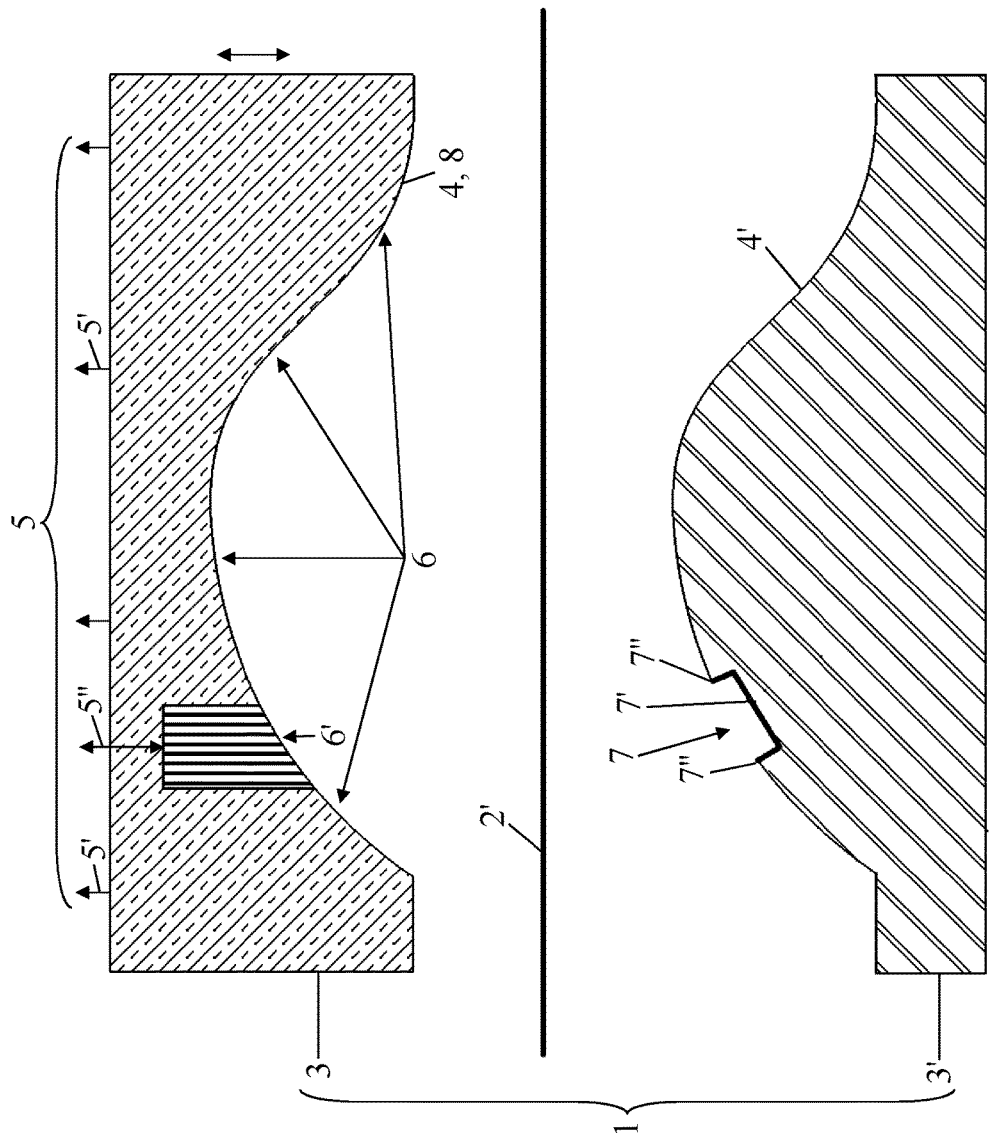
FIGS. 1A and 1B are a schematic lateral elevation view and a section view of a vacuum or negative pressure thermoforming molding device, according to two manners of embodiment of the invention.

FIGS. 1, 2 and 4 from the attached drawings show a thermoforming molding device for producing a part or thin-walled 2" skin 2 using a sheet 2 of thermoplastic material.

The molding device 1 consists of a two-part mold 3 and 3' with working surfaces 4, 4' of shapes that may or may not be noticeably complementary and of which at least one of the parts is moveable such that it defines an open and a closed state of the mold, with a first part 3 of a two-part mold 3, 3' comprising a means of suction 5 for pressing sheet 2' against its working surface 4 which finalizes the forming of part 2 by vacuum deformation (general shape+relief patterns).

Means of suction 5 comprise, on the one hand, a main means of suction 5' that is designed for and capable of generating a negative pressure or suction over a major portion 6 of working surface 4 of the first part 3 of the mold and, on the other hand, at least one secondary means of suction 5" that is designed for and capable of generating a negative pressure or suction in at least one specific limited area 6' of the working surface 4, this at least partially independently relative to the main means of suction 5'.

Figure 1B:
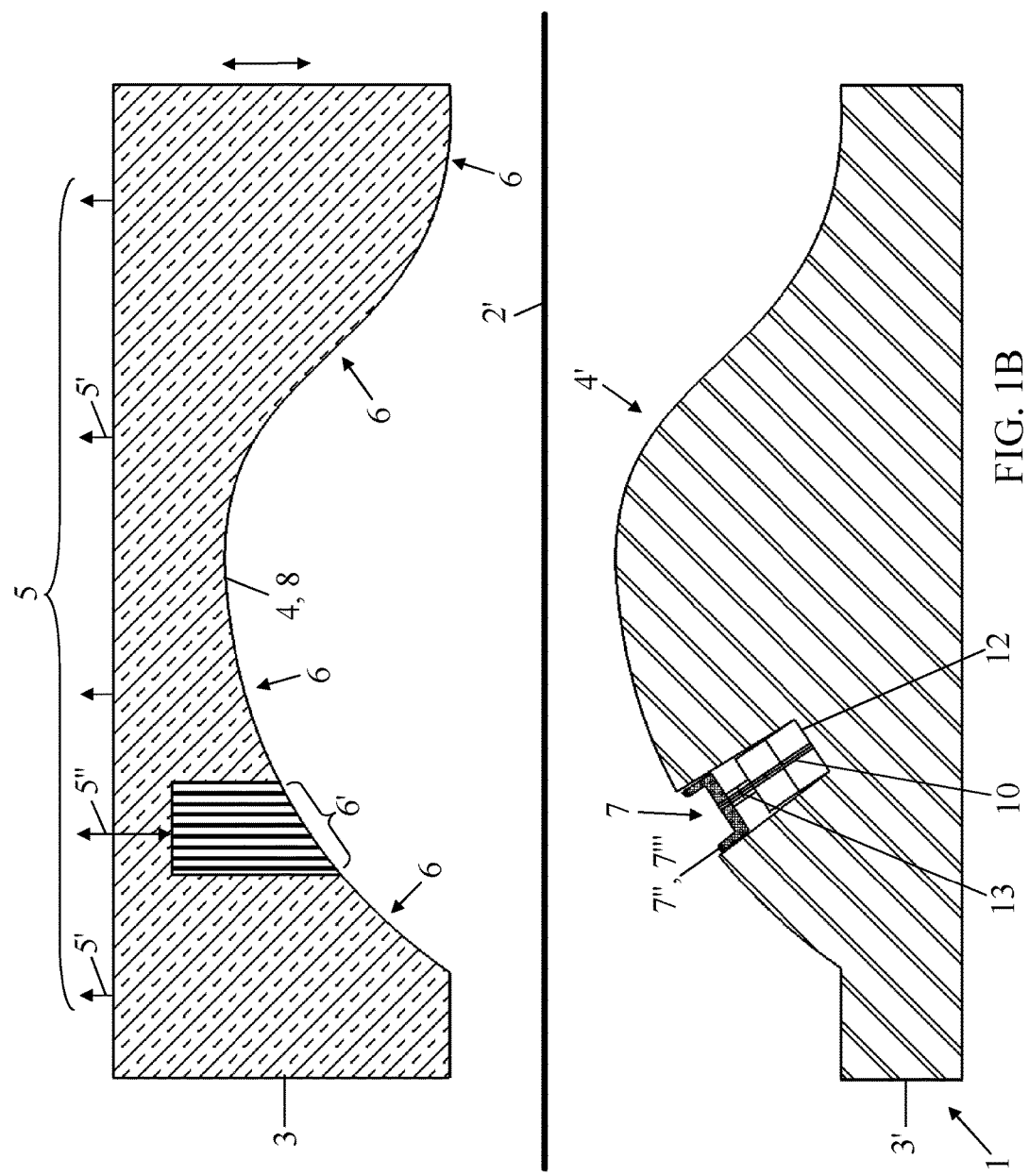
Figure 1C:
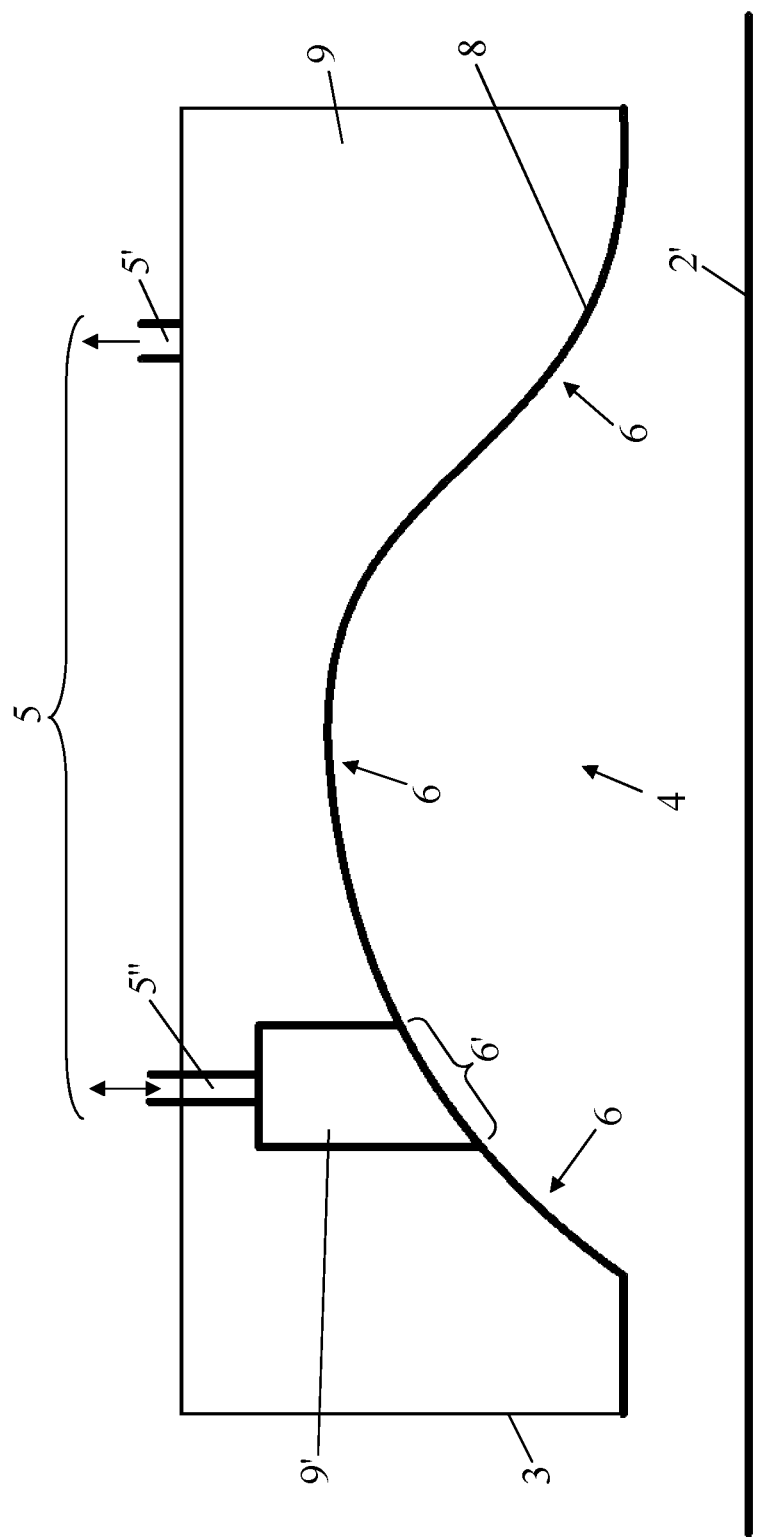
FIG. 1C is a schematic section view of the first part of a mold that is part of a device as shown in FIG. 1A or 1B, according to one particular manner of embodiment of the invention.

To simplify the illustrations, the methods used for leak proofing, vacuum suction and displacement of the mold parts 3 and 3' are not shown in the attached figures or else they are shown partly schematically in FIG. 1C.

In compliance with an embodiment of the invention, the second part of mold 3' comprises at least one integrated zone or an additional hollow shaping part 7, with the zone or part 7 being arranged so that it is located, when the mold is closed, directly facing or respectively from each specific limited area 6' of working surface 4 of the first part of the mold 3, with the or each secondary means of suction 5" being capable of being controlled, at least for stopping it or for suspending the suction, independently of the main means of suction 5'.

This way, an embodiment of the invention provides a molding device 1 which selectively allows the production of parts or skins 2 which may or may not have hollow local deformation zone(s) 14, depending on the command from the device 1 and all while preserving, during this local deformation operation, close contact of the skin or part 2 against the first part of the mold 3, in the major portion 6 of working surface 4, thus preventing any retraction or deformation of this skin or part 2 in the areas not subjected to local deformation.

When sheet 2' is preheated, the suction in the major portion 6 of the working area 4 will be advantageously held until the skin or part 2 are fully solidified and fixed.

Of course, portion 6 and the zone(s) 6' of working surface 4 may be connected to the same source of suction or vacuum controlled by the means of steering the molding device 1 (not shown), with the interposition of at least specific one shutoff means for the power of the or each zone 6' (not shown). As a variation, portion 6 and the or each zone 6' may also be connected to distinct sources (FIG. 1C).

The craftsman will easily understand that, with the aforementioned provisions, it is possible, with the same molding device 1, to produce different versions of the same skin or part 2, namely: without any locally deformed zone 14, with one or some zone(s) 14 present, or even with all the aforementioned zones 14, when a great many zones or parts 7 are planned, and none, some or all are used during the manufacture of the part or skin 2 concerned. Also, these different versions may be manufactured in a desired and selected sequence (or required by the customers' orders) without impacting productivity or yield in terms of parts produced, except for the additional time required to produce the additional local deformation(s). Nevertheless, at least a part of this time is in any case necessary in order to allow sufficient cooling of part 2 when it is newly formed in the mold.

In compliance with a first manner of embodiment of the invention, the or each secondary means of suction 5" and one that is designed for and capable of generating a positive pressure or a blowing action at the or each specific limited area 6' of working surface of the first part of the mold 3, such that it locally presses sheet 2' or wall 2" towards and into the zone or part 7.

This way, the or each local deformation of sheet 2' or wall 2" of the part or skin 2 is obtained through a positive action produced by the first part of the mold 3, that can be connected to a source of positive adaptive pressure (alternately with a source of suction for the specific limited zone(s) 6'), with the second part of mold 3' being able to be released from all active means of forming or deformation.

According to one advantageous manner of embodiment of the invention, arising from FIGS. 1, 2 and 4 in particular, the first part of the mold 3 comprises a multiperforated or porous wall 8 that is gas-permeable, and which provides the working surface 4 of the part 3, a main vacuum chamber 9 and at least one secondary vacuum chamber 9', with the chambers 9 and 9' being located on the side of wall 8 that is opposite to the working surface 4, connected to one or more suction lines and bounded in part by a portion of the porous or multiperforated wall 8 corresponding to the major portion 6 of working surface 4 or to one or at least one specific limited area 6' of the surface 4, respectively, with the porous wall 8, suction chambers 9 and 9' and the suction line(s) together forming the primary 5' and secondary 5" means of suction.

In compliance with another characteristic of an embodiment of the invention, the working surface 4 of the first part of mold 3 comprises structural features in relief all over it, namely in its major portion 6 and its specific limited zone(s) 6'.

In this way, relief patterns 16 (for example, embossing) may be present, even on the portion(s) of wall 2" that is/are subjected to hollow local deformation, both at the bottom and on the lateral surfaces of these deformations 14.

Preferably, and to facilitate deformation in the edges of the zones 14 of wall 2" of the skin or part 2, the or each specific limited area 6' of working surface 4 of the first part of the mold 3 is designed to feature a surface extension that is at least slightly greater than that of the corresponding zone or added-on hollow shaping part 7 that is present on the second part of mold 3', which is, in particular, slightly peripherally oversize.

In order to reach a precise local deformation 14, with edges 14" that are precisely finished, an embodiment of the invention advantageously proposes that the or each additional hollow shaping part 7 should be moveable in translation, preferably along a direction that is noticeably perpendicular to the working surface 4' of the second part of mold 3' or to the plane that is locally tangent to the working surface 4', with said part 7 being advantageously mounted interchangeably onto the second part of mold 3'.

In this way, the or each part 7 may be moved so that it comes into contact with wall 2" before local deformation of this latter occurs. Additionally, different types of parts 7 may be provided if applicable.

In compliance with a second manner of embodiment of the invention, which may be considered alternatively or cumulatively in relation to the aforementioned first variation, a suction line 10 may be provisioned either in association with the or each added on hollow shaping zone or part 7, with the zone or part 7 having, advantageously, a porous or multiperforated wall 7' that provides the working surface or the hollow conformation.

In compliance with a practical manner of embodiment of this second variation, which may or may not be combined with the first variation revealed previously, the second part of mold 3' comprises at least one hollow shaping part 7 having a peripheral edge 7", which may be selectively connected to a source of suction or sinking by a suction line 10 and which could be moved between, on the one hand, a folded position, in which said shaping part 7 is located at most barely touching wall 2" of the thermoformed part 2, or even pulled away or at most barely touching the surface of the second part of mold 3' and, on the other hand, a deployed position, in which the peripheral edge 7" of shaping part 7, which is very near or is pressed against wall 2" of the thermoformed part 2 pressed against the first part of the mold 3 (in which the distance between edge 7" and sheet 2" may be, for example, between 0 and 1 mm).

Preferably, the peripheral edge 7" of shaping part 7 has a conformed shape that is curved towards the interior, and which may be provided with a compression joint 7''', and which is capable, when it comes into contact or when it begins to deform, of tracing the outline of a chamber 11 that is noticeably leakproof with the wall 2" of thermoformed part 2. Also, said hollow shaping part 7 may be mounted so that it moves, possibly with a sliding track in a slot 12 prepared in the second part of mold 3', with the track being preferably also provided in the deployed position of the shaping part 7.

Edge 7" thus features a contour (especially an inside surface of the edge profile) that is adapted to the desired shape for the edge 14" of the deformed zone 14, in particular at least slightly rounded or curved in order to avoid breaking sheet 2' and therefore wall 2" of part 2. In this way, the shape of edge 7" (in fact the conformation of the inner side of this edge) determines the shape of the edge 14" of the locally deformed zone 14 of part 2.

Advantageously, the hollow shaping part 7, which is advantageously in the shape of a shell, is mounted on at least one support axle 13, preferably in a manner that is easily interchangeable, and which features a suction channel, where it is crossed by a suction conduit 10 connected to at least one crossing orifice, to secondary channels or microperforations that are arranged in the wall 7' of the shaping part 7 and discharging onto the internal working or conformation surface of the shaping part 7. Additionally, the bidirectional movement of this hollow shaping part 7 may be conducted by a pneumatic or hydraulic cylinder, mounted and positioned on or inside the second part of mold 3', where the slide tracking of the part 7 is conducted by the cylinder and/or a specific additional guide structure.

The manner of embodiment shown as an example in the attached figures shows only one single hollow shaping part 7.

Nevertheless, as a variation, and although it is not illustrated, at least two parts 7, which may or may not be mounted in the same part of mold 3, 3' and which can be activated selectively and independently, may be provided.

Due to the applicable moveable mounting of the or each hollow shaping part 7, it is possible to end up with an even greater universality of the molding device 1, in particular a greater versatility in terms of manufacture of different versions of part 2.

Another subject of the invention is a manufacturing process for a thin-walled part 2 using a sheet 2' made of thermoplastic material, by implementation of the device 1 of the mold described previously, where said part 2 may or may not include at least one localized zone 14 having a specific configuration.

This process, as shown in FIGS. 2 and 4 in the attached drawings, consists of placing a sheet 2', which may be subjected to preheating, between the first and second parts of mold 3 and 3', closing the mold to form a noticeably leakproof cavity 15 between the parts of a two-part mold 3 and 3', and possibly pre-form the sheet 2', and shaping the sheet 2' by plastic deformation through its close application against the working surface or by shaping 4 of a first part of mold 3 under the effect of a sucking or suction so as to produce part 2, opening the mold and extracting the resulting thermoformed part 2 from it.

In compliance with an embodiment of the invention, the process consists, additionally, in a selective manner and depending on the version of part 2 to be obtained, of creating, if applicable, at least one local deformation of sheet 2', after shaping of the sheet 2' by application against the first part of the mold 3 and whereas this latter is in a state that makes its plastic deformation possible, with the or each local deformation operation being carried out by moving the portion of plate 14' involved in one zone or hollow shaping part 7 present in the second part of mold 3', after suction has been removed from the specific limited zone(s) 6' of working surface 4 of the first part of the mold 3, with the portion(s) of plate 14' to be deformed being moved by blowing in the specific limited zone(s) 6', by a suction action in the area of the zone or hollow shaping part 7 or by a combination of the two abovementioned actions, where sheet 2' is held closely against the larger portion 6 of the working surface 4 of the first part of mold 3 while local deformation(s) 14 are taking place.

More precisely, and in relation with a preferred variation of an embodiment of the invention, the step of causing a local deformation 14 of sheet 2' consists of performing the following operations:
 release of suction in the specific limited area 6' involved in the working surface 4 of the first part of the mold 3;
 shifting of the hollow shaping part 7 from its folded position to a deployed position in which it approaches or presses, possibly under controlled pressure, against sheet 2' that forms wall 2" of part 2, with its peripheral edge 7";
 application of suction or making a sunken area in the shaping part 7 and/or blowing from the specific limited area 6' so as to locally deform sheet 2' and press it very closely against the surface of wall 7' of the shaping part;
 shutting off suction in part 7 and/or suppression of blowing in the portion of surface 6';
 shifting of shaping part 7 towards its folded position.

Figure 6A:
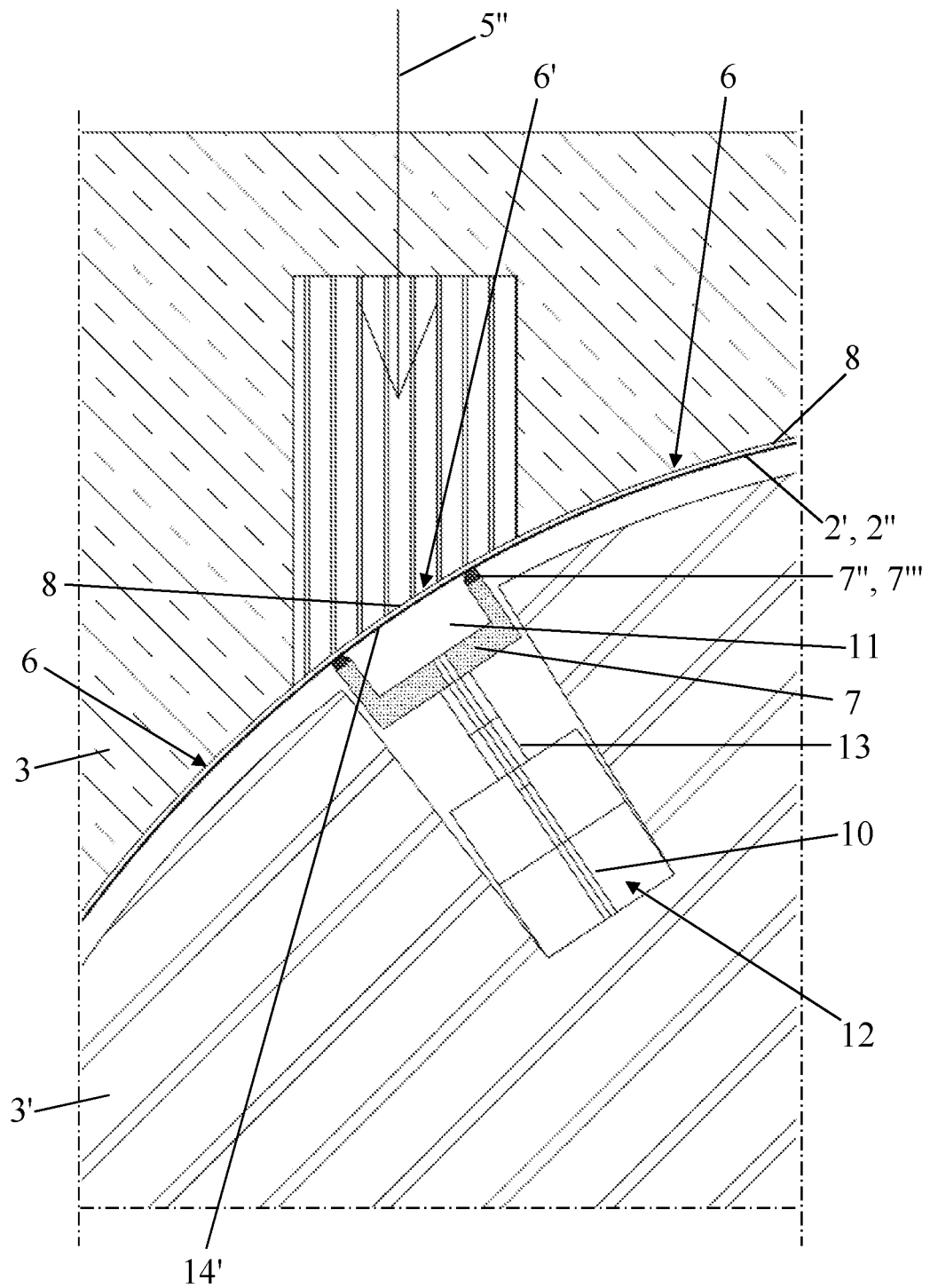
Figure 6B:
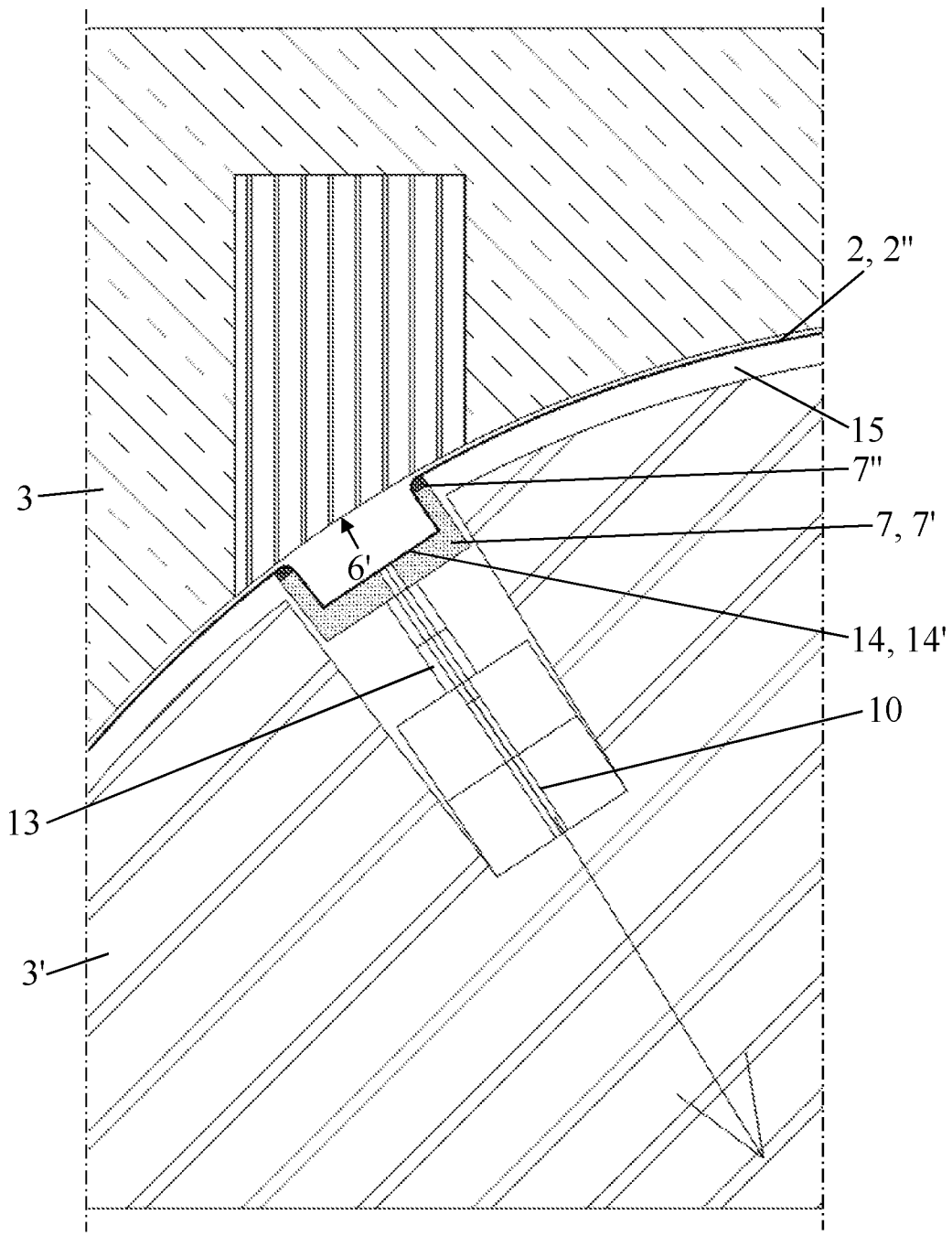
Figure 6C:
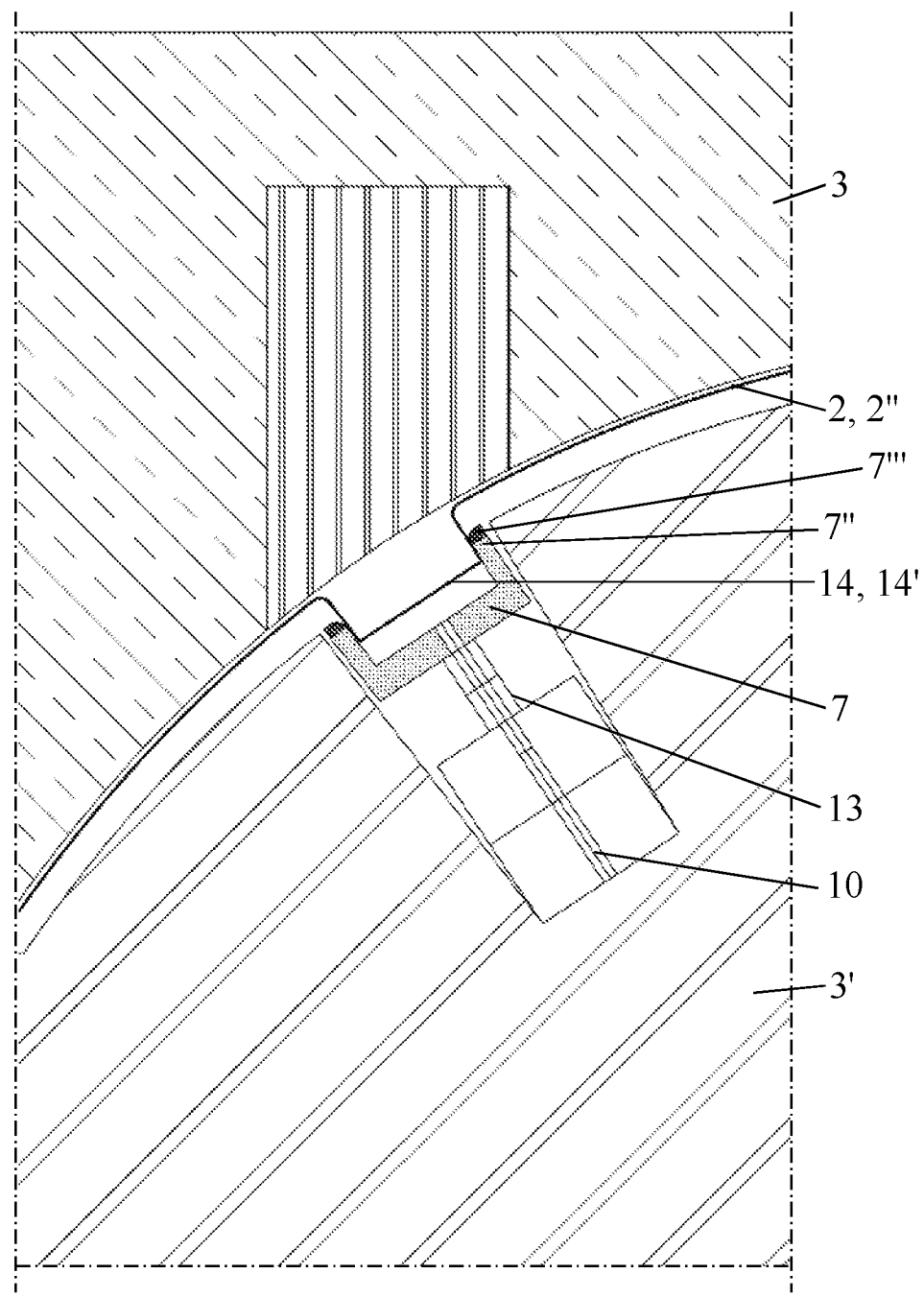

In compliance with one sub-variation of the process according to the invention, arising from FIGS. 6A through 6C, this latter may consist, after the release of suction from the or each specific limited area 6', of creating first of all a primary local deformation by blowing in order to bring sheet 2' into contact with edge 7" of part 7, then of making an additional deformation and final forming of the zone 14 of skin 2' involved in suction against the inside surface of the part 7.

As an example, and in particular when plate 2 is comprised of a material that is of the polyethylene, polypropylene or even polyvinyl chloride type, the plate 2 is preheated so that it is at a temperature of about 180° C. to 210° C. during the suction shaping phase, the optional consecutive phase of local deformation by blowing and/or suction and through the intermediary of the zone or part 7 being conducted when the material is still found to be in a plastically deformable condition, namely at a temperature of about 150° C. to 170° C.

In a context of optimized production management, the process may consist of producing, selectively, over a specified period of production, and as a function of a given manufacturing program resulting, for example, from a group of client orders that are diversified in terms of version of the part 1 desired, parts 2 which may or may not comprise one or more local zone(s) 14 with specific deformation or configuration.

In the abovementioned context, the process may additionally consist, between two cycles or programs of manufacture of parts 2 of different versions and which must feature one or more zone(s) 14 that are locally deformed and of different configuration(s) and appearance(s), of interchanging one or more hollow-shaped part(s) 7.

Figure 4B:
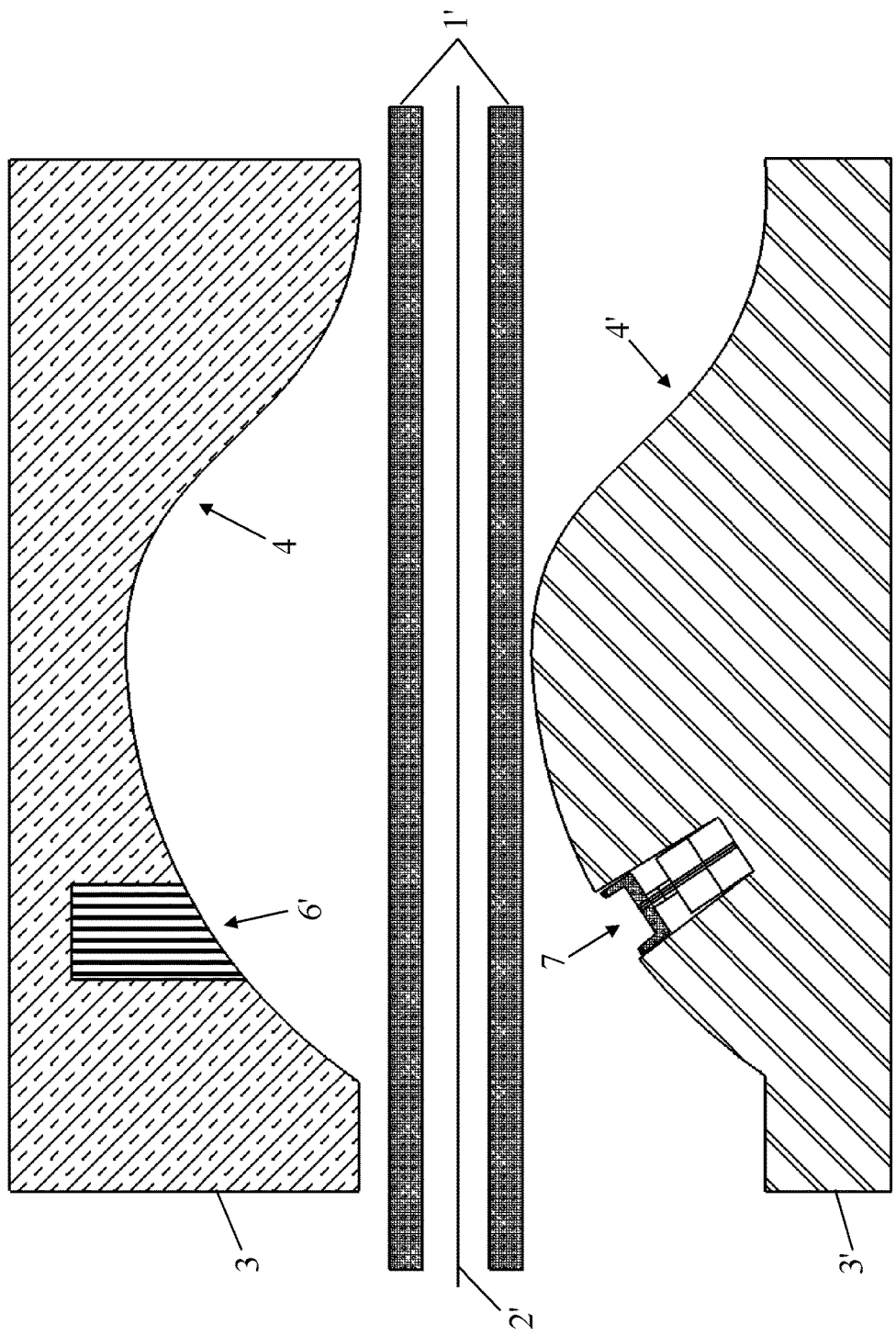
Figure 4C:
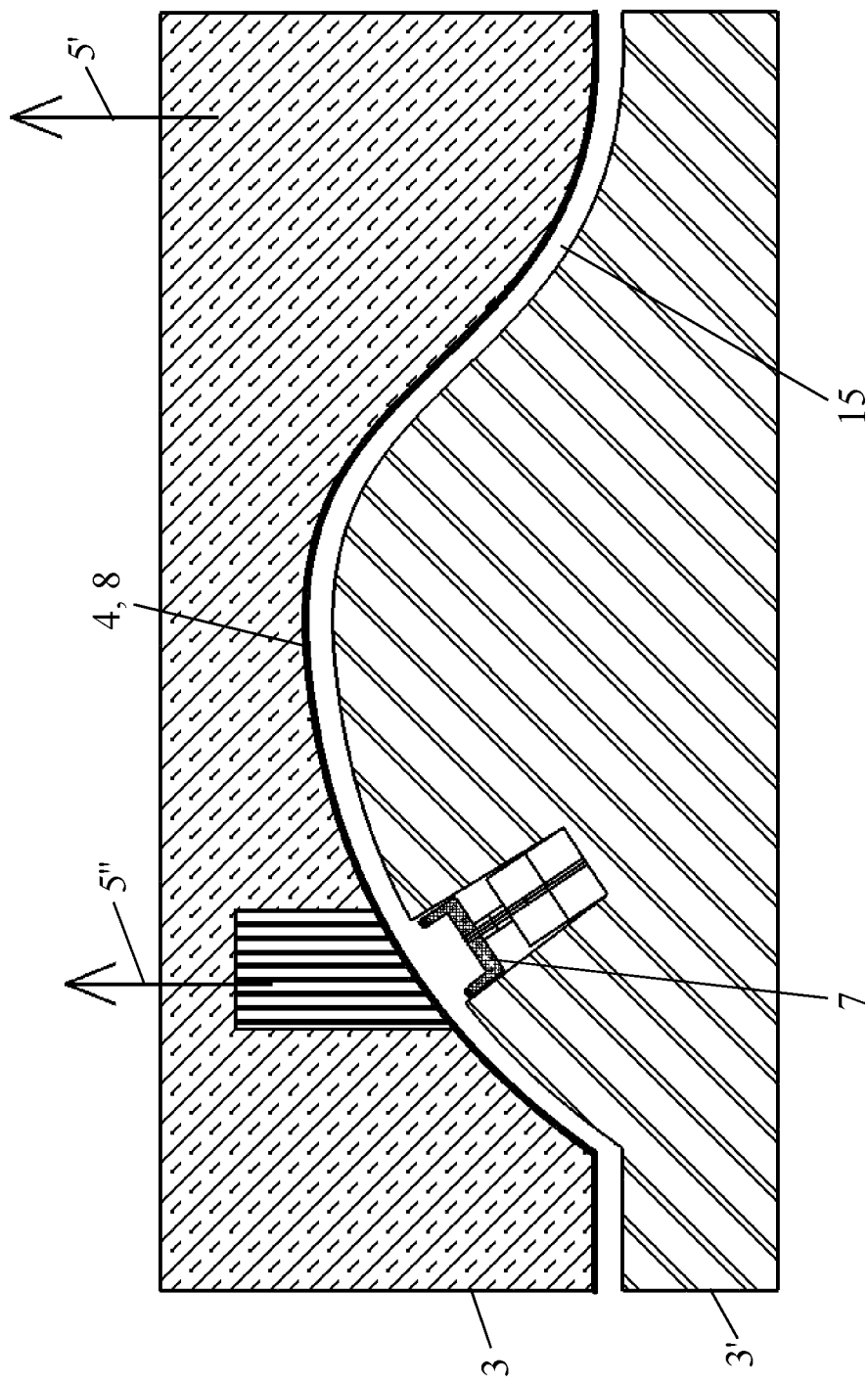
Figure 4D:
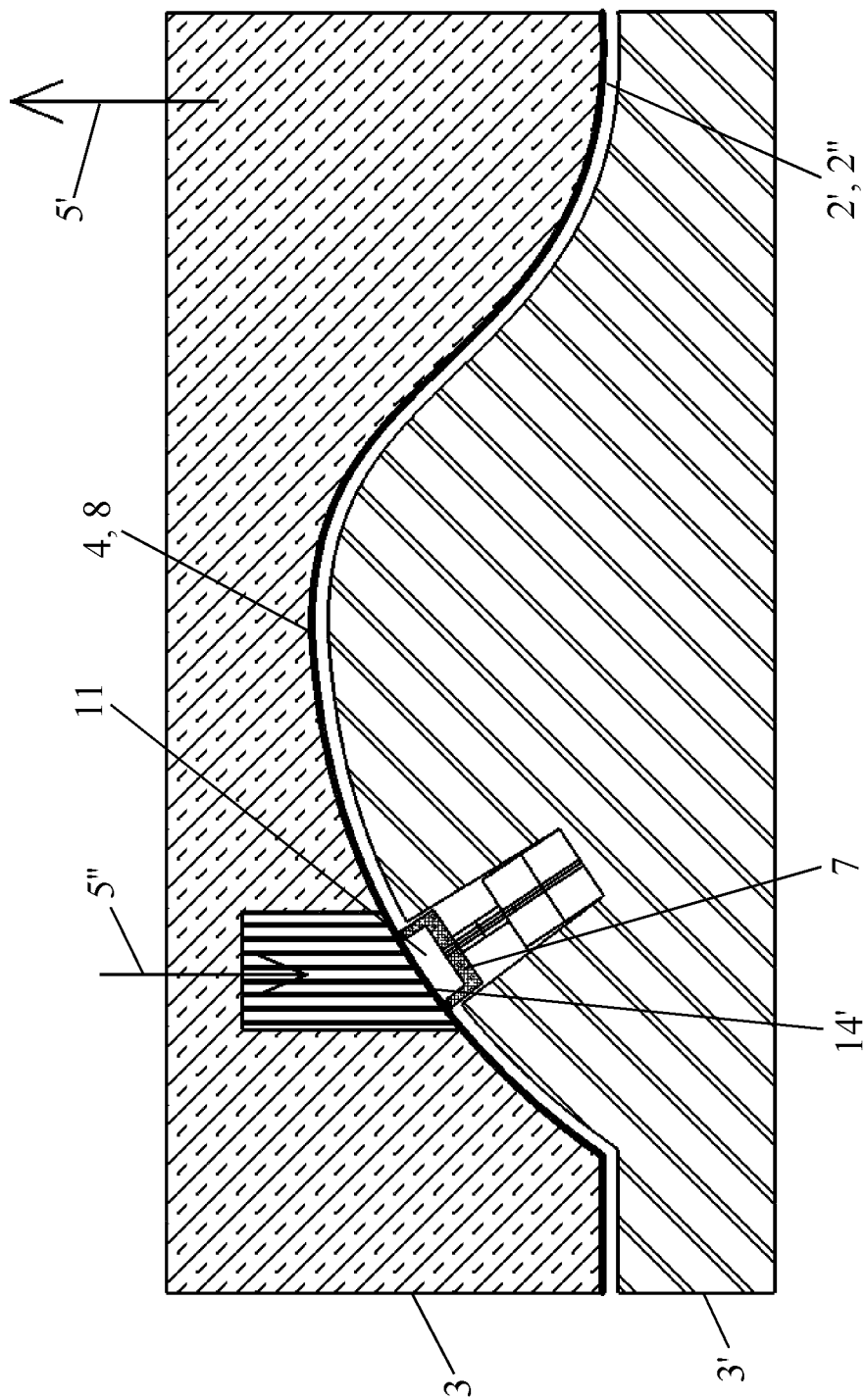
Figure 4F:
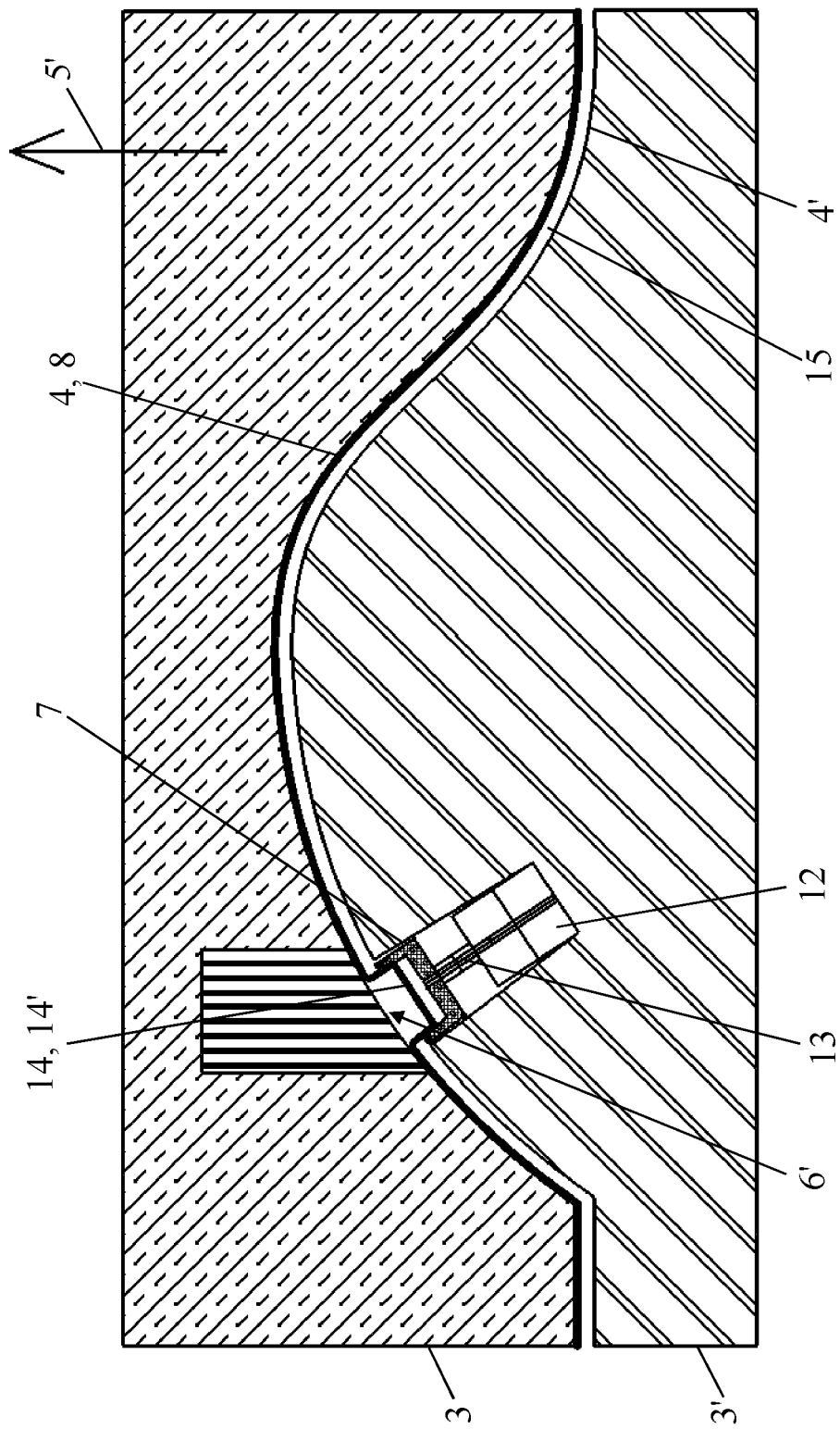
Figure 4G:
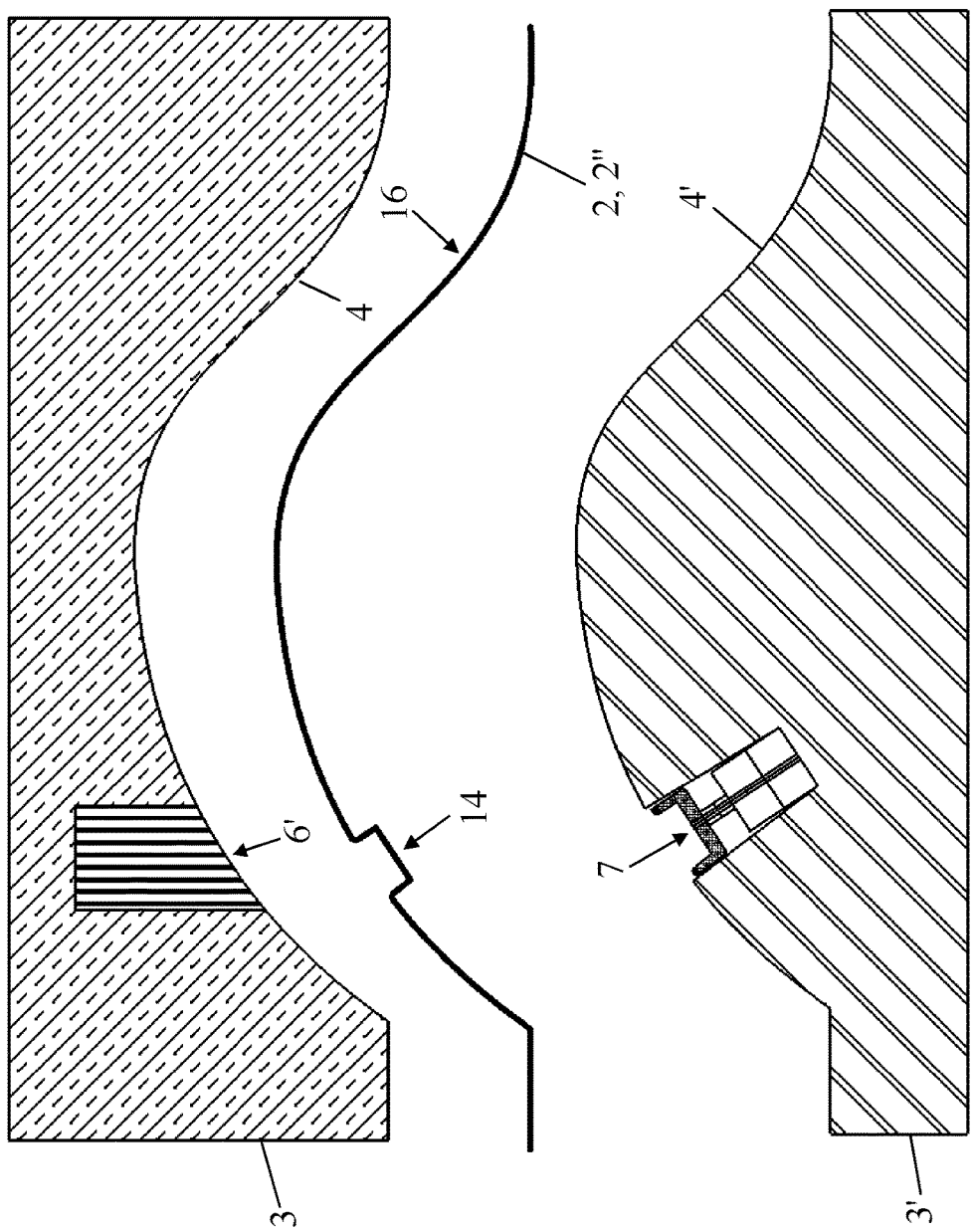

In relation to FIGS. 2A through 2D, on the one hand, and FIGS. 4A through 4G, on the other hand, it is understood that two scenarios of the progress of the manufacturing process of a part 2 can be implemented with molding device 1 as indicated in FIG. 1B, namely:
 introduction and preheating of sheet 2' (FIGS. 2A and 2B/FIGS. 4A and 4B: these figures are identical);
 closing of the mold and suction of the entire working surface 4, by implementation of the main means of suction 5' and of the secondary means of suction 5" (FIGS. 2C and 4C, which are identical)
 option 1: after part 2 has cooled off, the suction is shut off (in means 5' and 5"), the mold is opened and the part is extracted (FIG. 2D);
 option 2: the hollow shaping part 7 is deployed by translation and comes into contact with the wall 2" of part 2 pressed against working surface 4, the suction is released in the area of zone 6' (by being held at the level of the rest of surface 4) and a blowing action by this zone 6' and/or a suction action in the area of starting part 7 (FIG. 4D); the portion of wall 14' deforms and takes the interior shape of part 7 (FIG. 4E); the local suction and/or the blowing is shut off and part 7 is drawn back into the second part of mold 3' by translation, by unmolding the deformed portion 14' (FIG. 4F); the suction is cut off, the mold is opened and part 2 is extracted after it has cooled off (FIG. 4G).

Figure 2B:
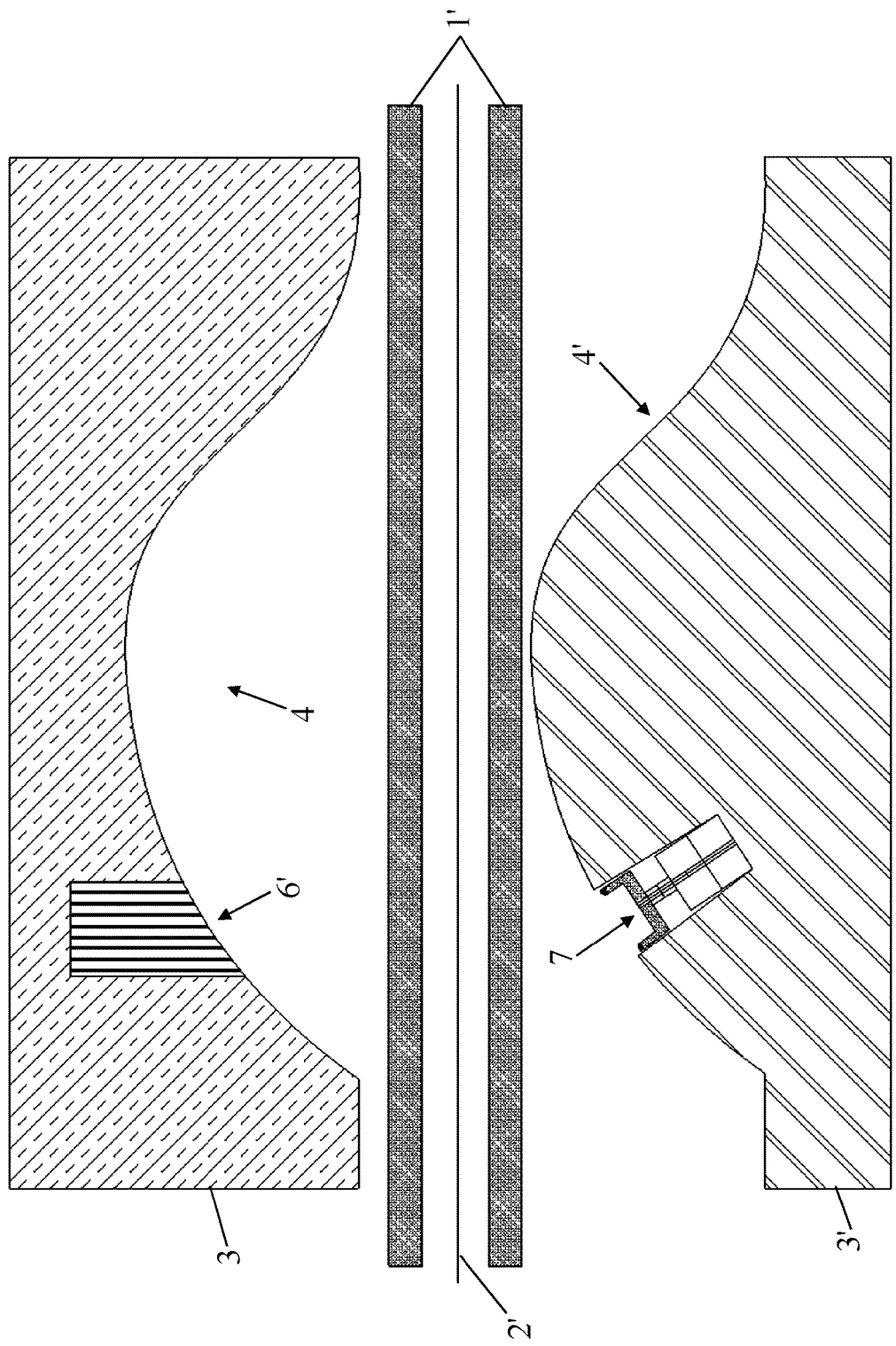

The means 1' used to heat sheet 2' may be either fixed and arranged next to the mold (heating of sheet 2' before it is installed between the two separated parts of the mold 3 and 3'), or may be moveable (heating of sheet 2' in the mold before it is closed, as shown in FIGS. 2B and 4B).

Figure 3:
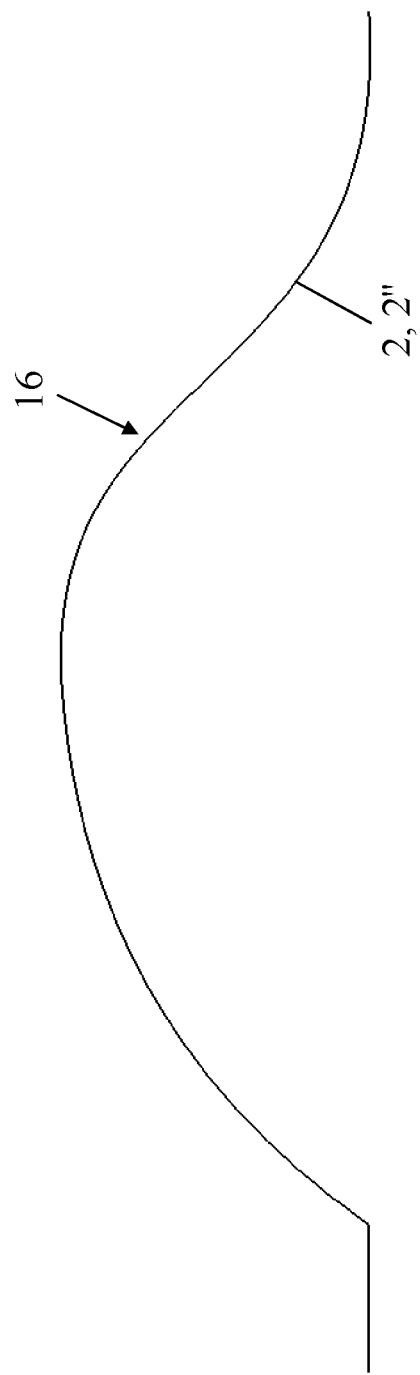
FIG. 3 is a section view of one part or skin obtained with the variation of execution of the process of FIGS. 2A through 2D.

Finally, as shown in FIGS. 3 and 5, an embodiment of the invention also involves a trimming or interior lining component that is either formed by a thin-walled 2" thermoformed part 2, or comprises a visible surface provided by this type of part 2. This part 2 optionally comprises at least one localized zone 14 that has a local deformation of its wall 2" or a specific local configuration, specifically a hollow deformation, and preferably forms the surface of a repeating design or relief 16.

In compliance with an embodiment of the invention, the thermoformed part 2 is obtained through the manufacturing process described previously and comprises at least one hollow deformation 14, which forms, for example, a housing for accommodating an accessory, as well as, if used, repetitive relief patterns, which may be present over the entire surface of the part 2.

Of course, the invention is not limited to the manners of embodiment described and shown in the attached drawings. Modifications remain possible, in particular from the point of view of the constitution of the various components or by substitution of technical equivalents, without however leaving the domain of protection of the invention.

The Invention claimed is:
1. A thermoforming molding device for the production of a thin-walled part using a sheet made of thermoplastic material,
 the molding device comprising a two-part mold with working surfaces of shapes that are complementary and of which at least one of the parts is moveable so that it defines an open and a closed state of the mold,
 with one first part of the two-part mold comprising a means of suction for pressing the sheet against its working surface, the means of suction comprising, a main means of suction that is designed for and capable of generating a negative pressure or suction on a major portion of the working surface of the first part of the mold and, at least one secondary means of suction that is designed for and capable of generating a negative pressure or suction in at least one specific limited area of the working surface, and the at least one secondary means of suction at least partially independent from the main means of suction,
a second part of the mold comprising at least one integrated zone or an added-on hollow shaping part, with each zone or part being arranged so that it is located, when the mold is closed, facing one of the at least one specific limited area of working surface of the first part of the mold, and with the or each secondary means of suction being capable of being controlled, at least for stopping it or for suspending the suction, independently of the main means of suction.

2. The molding device according to claim 1, wherein the or each secondary means of suction is designed for and capable of generating a positive pressure or a blowing action at the or each specific limited area of the working surface of the first part of the mold.

3. The molding device according to claim 1, wherein the first part of the mold comprises a multiperforated or porous wall that is gas permeable, and which provides the working surface the part, a main suction chamber and at least one secondary suction chamber, with the chambers being located on the side of the wall that is opposite the working surface, connected to one or more suction lines and bounded in part by a portion of the porous or multiperforated wall corresponding to the major portion of working surface or to one or at least one specific limited area of the surface, respectively, where the porous or multiperforated wall, the suction chambers and the suction line together form the primary and secondary means of suction.

4. The molding device according to claim 1, wherein the working surface of the first part of the mold comprises structural motifs in relief in its major portion and its specific limited area.

5. The molding device according to claim 1, wherein the or each specific limited area of the working surface of the first part of the mold features a surface extension that is greater than that of the corresponding added-on hollow shaping area or part that is present on the second part of mold, which is peripherally oversized.

6. The molding device according to claim 1, wherein the or each added on hollow shaping part is moveable in translation, along a direction that is perpendicular to the working surface of the second part of mold or to the plane that is locally tangent to the working surface , with said part being mounted interchangeably on the second part of mold.

7. The molding device according to claim 1, wherein a suction line is associated with the or each added-on hollow shaping area or part, with the zone or part having a porous or multiperforated wall that provides the working surface or hollow conformation.

8. The molding device according to claim 6, wherein the second part of mold comprises at least one hollow shaping part having a peripheral edge, that may be connected selectively to a source of suction or sinking by a suction line and which may be moved between, a folded position, in which said shaping part is located at most barely touching the wall of the thermoformed part, or pulled away or at most barely touching relative to the surface of the second part of mold and, a deployed position, in which the peripheral edge of said shaping part approaches or presses against the wall of thermoformed part pressed against the first part of the mold.

9. The molding device according to claim 6, wherein the peripheral edge of the shaping part features a shape that is curved inwards and that is capable of tracing out, when it comes into contact or begins deformation, a chamber that is leakproof with the wall of the thermoformed part and wherein the hollow shaping part is mounted so that it is moveable.

10. The molding device according to claim 9, wherein the peripheral edge of the shaping part features a compression joint, and the hollow shaping part is guided in translation in a housing that is arranged in the second part of mold, with the guide being also provided in the deployed position of the shaping part.

11. The molding device according to claim 6, wherein the hollow shaping part, in the shape of a shell, is mounted on at least one support axle, in a manner that is interchangeable, and the hollow shaping part features a suction channel or is crossed by a suction conduit connected to at least one crossing orifice, to secondary channels or to micro-perforations arranged in the wall of the shaping part and which discharge out onto the inside working or shaping surface of the shaping part and wherein the bidirectional travel of this hollow shaping part takes place through the use of a pneumatic or hydraulic cylinder, mounted and positioned on or in the second part of mold, and where the sliding tracking of the part is conducted by the cylinder and/or by a specific additional guide structure.

12. A manufacturing process of a thin-walled part using a sheet made of thermoplastic material, by implementation of the molding device according to claim 1, the process comprising: applying a sheet between the first and second parts of the mold, closing the mold to form a cavity that is leakproof between the two parts of the mold, and preforming the sheet, and conforming the sheet by plastic deformation through its close application against the working surface or by conformation of a first part of mold through a suction or vacuum effect so as to produce the part, opening the mold and extracting the resulting thermoformed part from it.

13. The manufacturing process according to claim 12 including carrying out at least one local deformation of the sheet when the sheet is in a condition that allows for its plastic deformation, after the sheet has been shaped by applying it against the first part of the mold, with the or each operation of local deformation being carried out by shifting the portion of a plate involved in a zone or hollow shaping part features, in the area of the second part of mold, after suction has been released from the specific limited area of the working surface of the first part of the mold, the shifting of the plate or portions of it to be deformed being obtained by a blowing action in the area of the specific limited area, by a suction action in the area or hollow shaping part or by a combination of the two aforementioned actions, where the sheet is held very closely against the major portion of the working surface of the first part of the mold while the local deformation(s) are taking place.

14. The manufacturing process according to claim 13, wherein the completion of the step of a local deformation of the plate includes the following operations:
  release of suction in the specific limited area of the working surface of the first part of the mold;
  displacement of the hollow shaping part from its folded position to a deployed position in which it approaches or presses against the sheet that forms a wall of the part, with its peripheral edge;
  application of suction or creation of a sunken area in the shaping part and/or blowing from the specific limited area so as to locally deform the sheet and press it very closely against the surface of wall of the shaping part;

release of suction in part and/or suppression of blowing in the portion of the specific limited area; and displacement of the shaping part towards its folded position.

15. The manufacturing process according to claim 12, wherein after suction has been released at the or each specific limited area, the process includes performing first of all a primary local deformation by blowing to bring the sheet into contact with edge of part, then of carrying out an additional deformation and final forming of the zone of the sheet by suction against the interior surface of the part.

16. The manufacturing process according to claim 12 including selectively producing the part, over a specific period of production, and as a function of a given manufacturing program resulting, from a group of client orders that are diversified in terms of the part version desired.

17. The manufacturing process according to claim 12, wherein between two manufacturing cycles or programs for parts of different versions and which feature one or more zone(s) that are locally deformed with different configuration(s) and appearance(s), the process includes interchanging one or more hollow-shaped part(s).

18. A trimming or interior lining component formed by a thin-walled thermoformed part or one comprising an associated surface provided by this type of part, with said part comprising at least one localized zone having a local deformation of its wall or a specific local configuration, and which forms the surface of a repeating design or relief, the thermoformed part is obtained through the manufacturing process according to claim 11 and comprises at least one zone with a hollow deformation, that forms a housing for accommodating an accessory, with the hollow deformation consisting of a plastic local deformation of the sheet forming the part obtained by suction of the portion of plate involved in a hollow shaping part.

* * * * *